Patented Feb. 19, 1974

3,793,398
ADHESIVE COMPOSITION OF UNSATURATED POLYESTER, EPOXY-ESTER AND THERMOPLASTIC RESIN
Sadakazu Hokamura, Yamato, Japan, assignor to Showa High Polymer Co., Ltd., Tokyo, Japan
No Drawing. Filed Jan. 26, 1972, Ser. No. 221,100
Int. Cl. C08g 45/04, 45/14
U.S. Cl. 260—835   2 Claims

ABSTRACT OF THE DISCLOSURE

This invention is intended to provide improved adhesive unsaturated polyester resinous compositions comprising an unsaturated polyester resin, which is synthetized by using a poly-hydric alcohol and a polycarboxylic acid, an unsaturated epoxy-ester resin, which is synthetized by using an epoxy compound and a carboxylic acid, and a thermoplastic resin which is compatible with the unsaturated epoxy-ester resin.

DETAILED EXPLANATION OF INVENTION

This invention relates to an improved adhesive unsaturated polyester resinous composition having the prolonged stability which comprises an unsaturated polyester resin, an unsaturated epoxy-ester resin having a terminal unsaturation bond or bonds and a thermoplastic resin which is compatible with the unsaturated epoxy-ester resin.

Heretofore, the unsaturated polyester resin and the thermoplastic resin are dissolved in a solvent or a polymerizable monomer respectively and they are mixed in use to produce an adhesive composition because the former is less compatible with the latter. Even if the unsaturated polyester resin was mixed with the thermoplastic resin to produce such an adhesive composition, the former is separated from the latter in two phases and the separated two phases can not be fully mixed with agitation and therefore they must be mixed just prior to use in the point of view of their workability. Thus, it is requested to develop an improved adhesive unsaturated polyester resinous composition which comprises the thermoplastic resin and has the prolonged stability and also to improve the characteristics of such an adhesive resinous composition. Under such an environment, we have investigated for producing a resinous composition improved in workability, adhesiveness and productivity by using certain components in combination with the unsaturated polyester resin and the thermoplastic resin. As the results, we have found that it is effective to use an unsaturated epoxy-ester resin which is compatible with the thermoplastic resin.

Therefore, the object of this invention can be achieved by replacing a minor part or a major part of the unsaturated polyester resin with the unsaturated epoxy-ester resin when an adhesive composition is manufactured by using the unsaturated polyester resin in combination with the thermoplastic resin. Namely, the object of this invention is to provide an improved adhesive unsaturated polyester resinous composition having the prolonged stability which comprises 1 to 50 weight parts of a thermoplastic resin and 100 weight parts of a resinous admixture of 5 to 95 weight percent of an unsaturated polyester resin and 95 to 5 weight percent of an unsaturated epoxy-ester resin, said unsaturated polyester resin being produced by using a polyhydric alcohol and a polycarboxylic acid and said unsaturated epoxy-ester resin being produced by using an epoxy compound and a carboxylic acid. In accordance with this invention, the one-package type adhesive composition is improved in the bonding strength because the unsaturated epoxy-ester has a higher bonding strength than that of the unsaturated polyester resin.

It is noted that the term "unsaturated polyester resin" used herein indicates the usual unsaturated polyester resins which are manufactured by mixing an unsaturated alkyd or an unsaturated modified alkyd, which is synthetized by reacting a polyhydric alcohol with an unsaturated polycarboxylic acid, part of which can be replaced with a saturated carboxylic acid, with a polymerization inhibitor and a copolymerizable monomer.

Examples of the unsaturated polycarboxylic acids and the saturated carboxylic acids used in the synthesis of the unsaturated alkyd or modified alkyd are maleic acid, maleic acid anhydride, fumaric acid, citraconic acid, itaconic acid, tetrachlorophthalic acid, anhydride, Het acid, tetrobromophthalic acid anhydride, phthalic acid, isophthalic acid, terephthalic acid, endomethylene tetrahydrophthalic acid anhydride, tetrahydrophthalic acid anhydride, hexahydrophthalic acid anydride, succinic acid, adipic acid, azelaic acid, sebacic acid, an adduct of anthracene and maleic acid anhydride, an adduct of rosin and maleic acid anhydride glutaric acid, an adduct of cyclopentadiene and unsaturated carboxylic acid.

It is also noted that benzoic acid and p-tertiary butyl benzoic acid can be used for controlling the molecular weight of the unsaturated alkyd and unsaturated modified alkyd and that such an alkyd can be modified with a monohydric alcohol.

Examples of the polyhydric alcohols used for the synthesis of the unsaturated alkyd or the unsaturated modified alkyd are ethylene glycol, glycerine, propylene glycol, butane-diol-1,4, butane-diol-1,3, butane-diol-2,3, diethylene glycol, dipropylene glycol, trimethylene glycol, pentane-diol-1,5, hexane-diol-1,6, neopentyl glycol, 2,2,4-trimethylpentane-diol-1,3, hydrogenated bisphenol A, 2,2-di(4-hydroxy-propoxy phenyl) propane trimethylene glycol, pentaerythritol and 2-ethyl-1,3-hexane-diol.

It is noted that the unsaturated alkyd can be modified with a monohydric alcohol.

Examples of the polymerization inhibitors used for the preparation of the unsaturated alkyd or the unsaturated modified alkyd are hydroquinone, p-tertiary butyl catechol, methoxy-hydroquinone, benzoquinone and copper salts.

Examples of the copolymerizable monomers used for the preparation of the unsaturated alkyd or the unsaturated modified alkyd are esters of acrylic acid such as ethylacrylate, hydroxy-propylacrylate and butylacrylate; esters of methacrylic acid such as methyl-methacrylate, cyclohexyl-methacrylate, lauryl-methacrylate and 2-hydroxy-ethyl-methacrylate; vinyl benzene, vinyl toluene, acrylonitrile, methacrylonitrile, cyclopentadiene, divinyl benzene, vinyl pyridin, vinyl acetate, diallyl-phthalate; polyfunctional acrylic or methacrylic compounds such as ethylene glycol-diacrylate, tri-methylol-propane-trimethacrylate and polyethylene glycol-dimethacrylate; chlorostyrene and α-methylstyrene. It is noted that such copolymerizable monomers can be used alone or in combination thereof.

It is noted that the term "thermoplastic resin" used herein indicates polymers, for example, of vinyl esters, vinyl ethers, acrylic acid or its derivatives, methacrylic acid or its derivatives, vinyl benzene or its derivatives, butadiene or its derivatives or copolymers thereof. The thermoplastic resin includes, for example, poly-methylacrylate, polyethylacrylate, polyvinylethylether, a copolymer of vinyl benzene and ethylacrylate, polyvinylacetate, a copolymer of butadiene and acrylonitrile and the like. Such a thermoplastic resin may be used as it is or after it is dissolved in a polymerizable monomer.

Also, it is noted that the term "unsaturated epoxy-ester" used herein indicates reaction products which are produced by reacting epoxy compounds having one or more epoxy radicals in the molecule with unsaturated monocarboxylic acids, part of which can be replaced by one or more members selected from the group consisting of saturated monocarboxylic acids, saturated polycarboxylic acids, their anhydrides, unsaturated polycarboxylic acids and their anhydrides, under heating by using an esterification catalyst in the presence or absence of a polymerization inhibitor, a solvent or a polymerizable monomer, and if desired the reaction products may be mixed with the solvent or the copolymerizable monomer after the reaction is finished. In such a reaction, it is possible to use the carboxylic acid components in an amount more than 0.1 mol of the total carboxyl radicals of the carboxylic acids used per mole of the epoxy compounds having one or more epoxy radicals and it is preferable to use the carboxylic acid components in an amount ranging from 0.2 to 2 moles of the total carboxyl radicals per mole of the epoxy radical of the epoxy compounds in the point of view of the curability and quality of the unsaturated epoxy-ester resin. The polymerization inhibitor, the solvent and the polymerizable monomer are the same as those indicated hereinbefore, and their amount can be varied depending on the curability, workability and quality of the unsaturated epoxy-ester resin required in use.

The epoxy compounds used for synthetizing the unsaturated epoxy-ester resins are classified as follows.

(1) Epoxy compounds which are produced by reacting a bis-phenol A with epichlorohydrine and indicated by the formula:

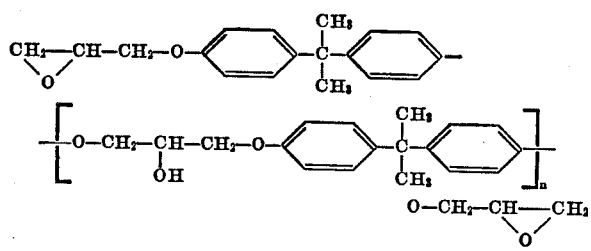

Examples of such epoxy compounds are listed as follows:

(2) Epoxy compounds which are produced by reacting a bis-phenol A with methyl epichlorohydrine and indicated by the formula:

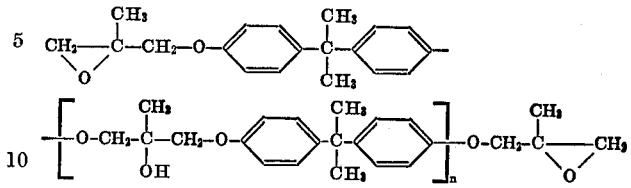

Examples of such epoxy compounds are listed as follows:

| Makers | Trade name | Melting point (° C.) | Viscosity at 25° C. (poise) | Epoxy-equivalent |
|---|---|---|---|---|
| Dainihon-Inki | Epiclon-800 | Liquid | 250-750 | 195-225 |
|  | Epiclon-1000 | 63-75 |  | 450-525 |
|  | Epiclon-4000 | 90-100 |  | 750-900 |

(3) Epoxy compounds which are produced by reacting novolaks with epichlorohydrine and indicated by the formula:

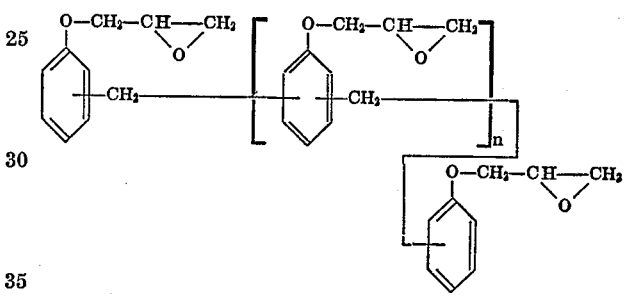

Examples of such epoxy compounds are listed as follows:

| Makers | Trade name | Melting point (° C.) | Viscosity at 25° C. (poise) | Epoxy-equivalent | $n$ |
|---|---|---|---|---|---|
| Dow chemical | DEN-431 | Liquid | 14-20 | 172-179 | 0.2 |
|  | DEN-438 | Liquid | 300-900 | 175-182 | 1.6 |
|  | DEN-448 | 87-95 |  | 225-250 |  |
| Ciba | Araldite-1235 | 35 |  | 200 |  |
|  | Araldite-1273 | 73 |  | 225 |  |
|  | Araldite-1280 | 80 |  | 230 |  |
|  | Araldite-1290 | 99 |  | 235 |  |

| Makers | Trade name | Melting point (° C.) | Viscosity at 25° C. (poise) | Epoxy-equivalent | Molecular weight (approximate) |
|---|---|---|---|---|---|
| Shell | Epikote-827 | Liquid | 90-110 | 180-190 |  |
|  | Epikote-828 | Liquid | 120-150 | 184-194 | 380 |
|  | Epikote-834 | Liquid |  | 230-270 | 470 |
|  | Epikote-1001 | 64-74 |  | 450-500 | 900 |
|  | Epikote-1004 | 96-104 |  | 900-1,000 | 1,400 |
|  | Epikote-1007 | 122-131 |  | 1,750-2,100 | 2,900 |
|  | Epikote-1009 | 144-158 |  | 2,400-3,300 | 3,750 |
| Ciba | Araldite GY-250 | Liquid | 90-110 | 180-190 |  |
|  | Araldite GY-260 | Liquid | 120-160 | 180-200 | 380 |
|  | Araldite GY-280 | Liquid |  | 225-280 |  |
|  | Araldite GY-6071 | 64-74 |  | 450-500 | 900 |
|  | Araldite GY-6084 | 96-104 |  | 900-1,000 | 1,400 |
|  | Araldite GY-6099 | 140-154 |  | 2,000-3,500 | 3,750 |
| Union Carbide | ERL-2772 | Liquid | 70-90 | 175-185 |  |
|  | ERL-2774 | Liquid | 110-135 | 180-195 |  |
|  | ERL-2002 | 65-75 |  | 450-520 |  |
| Dow Chemical | DER-330 | Liquid | 70-100 | 182-189 |  |
|  | DER-331 | Liquid | 110-140 | 186-192 |  |
|  | DER-332 | Liquid | 40-64 | 172-176 |  |
|  | DER-661 | 70-80 |  | 475-575 |  |
|  | DER-664 | 135-155 |  | 3,500-5,500 |  |

(4) Epoxy compounds which are produced by reacting glycols with epichlorohydrine and indicated by the formula:

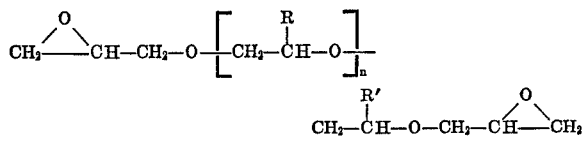

Examples of such epoxy compounds are DER-732- (epoxy-equivalent=305–335 and $n=5.6$) and DER-736- (epoxy-equivalent=175–205 and $n=3.0$) which is the trade name and sold by Dow Chemical Co.

(5) Epoxy compounds which are produced by reacting halogenated bis-phenol with epichlorohydrine and indicated by the formula:

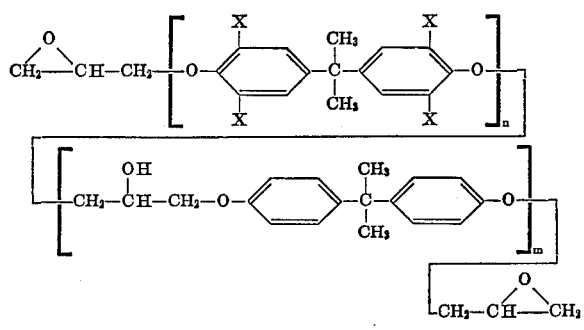

Examples of such epoxy compounds are listed as follows:

| Makers | Trade names | Melting point (°C.) | Viscosity at 25°C. (poise) | Epoxy-equivalent | Bromine (percent) |
|---|---|---|---|---|---|
| Dowchemical | DER-511 | 68–80 | | 445–520 | 18–20 |
| | DER-542 | 51–61 | | 350–400 | 44–48 |
| | DER-580 | Liquid | 50 | 214–221 | 16–18 |
| Ciba | Araldite-8011 | 70–80 | | 455–500 | 19–23 |
| | Araldite-8047 | | ¹3.5 | 223–246 | 18–22 |

¹At 70° C.

(6) Epoxy compounds which are produced by oxidizing the double bond of unsaturated compound and classified into "Unox-201" having the formula of

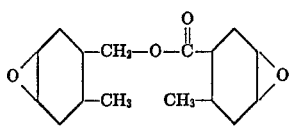

(liquid, viscosity=18–22 poises at 25° C. and epoxy-equivalent=152–160), "Unox-221" having the formula of

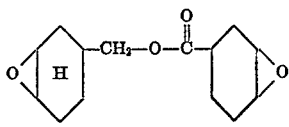

(liquid, viscosity=4.5–6.0 poises at 25° C. and epoxy-equivalent=134–140), "Unox-206" having the formula of

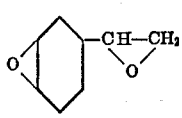

(liquid, viscosity=0.06–0.08 poises at 25° C. and epoxy-equivalent=74–78) and "Unox-207" having the formula of

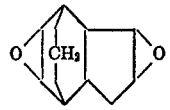

(melting point=35–50° C. and epoxy-equivalent=82–92) which are the trade names and sold by Union Carbide Company, and "Araldite CY-175 and -176" having the formula of

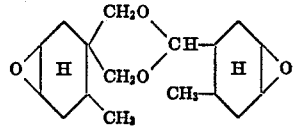

(liquid and epoxy-equivalent=147 and 177) which are the trade names and sold by Ciba Company.

(7) Epoxy compounds which are designated as "Oxiron" and sold by FMC in U.S.A., and indicated by the formula:

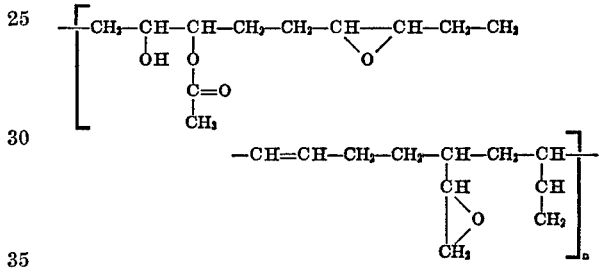

Examples of the "Oxiron" are "Oxiron-2000" which is a liquid and has the viscosity of 1800 poises at 25° C. and the epoxy-equivalent of 177, "Oxiron-2001" which is a liquid and has the viscosity of 160 poises at 25° C. and the epoxy-equivalent of 145 and "Oxiron-2002" which is a liquid and has the viscosity of 15 poises at 25° C. and the epoxy-equivalent of 232.

(8) Epoxy compounds which are produced by reacting an adduct of phenol and ethylene oxide or propylene oxide with epichlorohydrine and indicated by the formula:

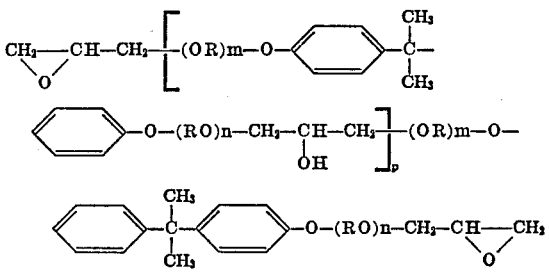

(R=ethylene or propylene radical)

Examples of such epoxy compounds are "Adeka EP-4000" and "Adeka EP-4001" which are the trade names and sold by Asahi Denka in Japan. The "Adeka EP-4000" is a liquid and has the viscosity of 30 to 40 poises at 25° C. and the epoxy-equivalent of 330 to 360, and the "Adeka EP-4001" is a liquid and has the viscosity of 50 to 60 poises at 25° C. and the epoxy-equivalent of 250 to 280.

(9) Epoxy compounds which are produced by reacting carboxylic acids with epichlorohydrine or methyl epichlorohydrine and indicated by the formula:

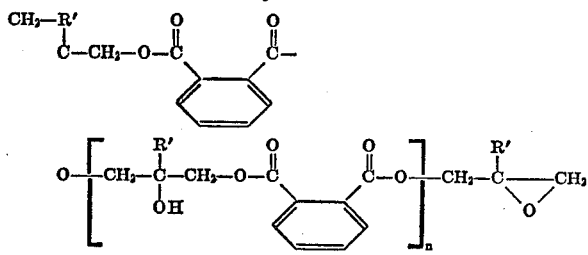

Examples of such epoxy compounds are listed as follows:

| Makers | Carboxylic acids | Trade names | State of— | Viscosity at 25° C. (poise) | Epoxy equivalent |
|---|---|---|---|---|---|
| Nihon-Kayaku | Phthallic acid | AK-737 | Liquid | 40–100 | 200–230 |
| Dainihon-Inki | do | AK-838 | do | 15–65 | 180–200 |
| | do | Epiclon-200 | do | 13–45 | 160–200 |
| | Methyl-tetrahydro-phthallic acid anhydride | Epiclon-300 | do | 7.7 | 180–200 |
| | Hexahydrophthallic acid anhydride | Epiclon-400 | do | 4.5–10 | 170–210 |

It is noted that the above mentioned epoxy compounds can be used alone or in combination thereof.

It is noted that the term "carboxylic acid" herein used for the preparation of the unsaturated epoxy-ester resin indicates the unsaturated monocarboxylic acids, saturated monocarboxylic acids, saturated polycarboxylic acids, their anhydrides, the unsaturated polycarboxylic acids and their anhydrides.

Examples of the unsaturated monocarboxylic acids are acrylic acid, methacrylic acid and crotonic acid. It is possible to use mono-esters of the unsaturated polycarboxylic acids such as a mono-ethylester of maleic acid. Such a mono-ester may be used in combination with the unsaturated monocarboxylic acid.

Examples of the saturated monocarboxylic acids and the saturated and unsaturated polycarboxylic acids are acetic acid, benzoic acid, maleic acid, maleic acid anhydride, fumaric acid, citraconic acid, itaconic acid, tetrachlorophthalic acid anhydride, Het acid, tetrobromophthalic acid anhydride, phthalic acid, isophthalic acid, terephthalic acid, endomethylene tetrahydrophthalic acid anhydride, tetrahydrophthalic acid anhydride, hexahydrophthalic acid anhydride, succinic acid, adipic acid, azelaic acid, sebacic acid, an adduct of anthracene and maleic acid anhydride, an adduct of rosin and maleic acid anhydride, glutaric acid, an adduct of cyclopentadiene and unsaturated carboxylic acid, trimellitic acid anhydride and pyromellitic acid anhydride, and it is noted that they are used alone or in combination thereof.

The esterification catalyst used for the preparation of the unsaturated epoxy-ester resin includes primary, secondary and tertiary amines; their inorganic or organic acid salts; quaternary ammonium salts; Lewis acids; adducts of Lewis acids and organic compounds; metal halides; metal hydroxides; hydrogen halides; and alkyl titanates. Examples of the esterification catalysts are n-butylamine, dimethylamine hydrochloride, triethylamine, tetramethylammonium chloride, boron trichloride, trifluoroborn-monoethylamine, lithium chloride, lithium hydroxide, hydrogen bromide and butyl-titanate, and it is noted that they can be used alone or in combination thereof.

One or more solvents are used in accordance with this invention and it is preferable to use at least one of solvents selected from the group consisting of benzene, ethyl alcohol, dipropyl ketone, ethyl acetate, dicarbitol, ethyl lactate, diacetone alcohol, isopropyl cellosolve, petroleum, acetal ethylether, aceto-acetic acid and Cellosolve acetate.

Also, in accordance with this invention, organic peroxides and polymerization accelerators can be mixed with the adhesive compositions in order to make them curable at room temperature or elevated temperatures. Further, the adhesive compositions of this invention may be mixed with reinforcing materials, inorganic or organic fillers and pigments if desired.

It should be understood that this invention can be modified without departing the spirit of this invention and it is illustrated by the following examples.

EXAMPLE 1

Syntheses of an ortho type unsaturated polyester resin and an unsaturated epoxyester resin were carried out in the following manner.

(i) Synthesis of unsaturated polyester resin 10.5 mols of propylene glycol, 5 mols of maleic acid anhydride and 5 mols of phthalic acid anhydride were reacted at a temperature of 180° C. to 200° C. in the presence of a carbon dioxide gas stream to produce an unsaturated alkyd resin having an acid value of about 40, and 70 weight parts of the resultant alkyd resin was dissolved in 30 weight parts of styrene containing 0.02 weight part of hydroquinone. The thus produced resin was designated as "unsaturated polyester resin (A)," and had the viscosity of 15 poises at 25° C.

(ii) Synthesis of unsaturated epoxy-ester resin 98 weight parts of maleic acid anhydride, 2000 weight parts of Epikote 828 (the trade name of epoxy resin produced by Shell Co.), 687 weight parts of methacrylic acid, 11.3 weight parts of benzyl dimethyl-amine and 0.01 weight part of hydroquinone were charged into a 3 liters-flask equipped with a stirrer, a refluxing condenser and a thermometer, and were reacted at 120° C. for 2 hours by heating the flask in an oil bath. The resultant unsaturated epoxyester had an acid value of almost zero. To 100 weight parts of this unsaturated epoxyester was added 35 weight parts of styrene to produce an "unsaturated epoxy-ester resin (A)." The thus produced "unsaturated epoxy-ester resin (A)" had the viscosity of 7.8 poises at 25° C.

(iii) Preparation of thermoplastic resin 40 weight parts of styrene and 30 weight parts of methyl methacrylate were mixed with 30 weight parts of polymethyl methacrylate (the degree of polymerization=about 500), and they were heated to produce a resinous mixture. The resultant resinous mixture was designated as "thermoplastic resin (A)."

In this Example 1, an adhesive composition was prepared in the following manner for the purpose of binding a thermoplastic resin such as an acrylonitrile-styrene copolymer (AS resin), and acrylonitrile-butadiene-styrene copolymer (ABS resin) or a Pb-alloy.

300 weight parts of the unsaturated epoxyester resin (A) was fully mixed with 500 weight parts of the unsaturated polyester resin (A), and 200 weight parts of the thermoplastic resin (A) was then added to the resultant mixture and fully mixed. The thus obtained product was designated as an "adhesive composition (1)."

Also, 200 weight parts of the thermoplastic resin (A) were fully mixed with 800 weight parts of the unsaturated polyester resin (A), and the resultant product was designated as an "adhesive composition (2)."

The adhesive compositions (1) and (2) were tested for compatibility and bonding strength, and the test results are given in the following Table I.

TABLE I

| Performance | Composition of— | | | |
|---|---|---|---|---|
| | Adhesive compositoin | | Unsaturated polyester resin (A) | Unsatruated epoxyester resin (A) |
| | (1) | (2) | | |
| Compatibility | Good | Bad [1] | | |
| Bonding strength; | | | | |
| AS-AS | AS itself was broken | 161 kg./4 cm.$^2$ | 105 kg./4 cm.$^2$ | 190 kg./4 cm.$^2$ |
| ABS-ABS | ABS itself was broken | 140 kg./4 cm.$^2$ | 90 kg./4 cm.$^2$ | 155 kg./4 cm.$^2$ |
| Pb alloy-Pb alloy | 75 kg./4 cm.$^2$ | 50 kg./4 cm.$^2$ | 19 kg./4 cm.$^2$ | 40 kg./4 cm.$^2$ |

[1] Homogeneity of the adhesive composition (2) was broken.

In this example, 100 weight parts of each of the adhesive compositions (1) and (2) was mixed with one weight part of a solution containing a 55% methyl-ethyl-ketone peroxide dissolved in dimethyl phthalate and one weight part of a solution containing a 6% cobalt of cobalt naphthenate dissolved in solvent naphtha. The curing of the adhesive compositions were conducted at 60° C. for one hour. Each of the AB resin and the ABS resin was cut into strips having a thickness of 3 millimeters. Two strips of the AB resin were adhered each other in a lapping area of 2 centimeters (in width) x 2 centimeters (in length) to form a test piece. In the same manner, two strips of ABS resin were adhered each other to form a test piece. Also, the Pb-alloy containing a 95% of Pb and a 5% of Sb was cut into strips having a thickness of 8 millimeters. Two strips of the Pb-alloy were adhered each other in a lapping area of 1 centimeter (in width) x 4 centimeters (in length) to form a test piece. After completion of the curing of the adhesive compositions (1) and (2), the test pieces were tested for a bonding strength by means of a test machine for measuring the bonding strength.

Also, it was found that the homogeneity of the adhesive composition (1) was not broken even after it was left as it was at room temperature for three months and also that such a long-stored composition (1) was the same in the bonding strength as an adhesive composition (1) which was freshly produced.

EXAMPLE 2

Syntheses of an unsaturated polyester resin and an unsaturated epoxy-ester resin were carried out in the following manner.

(i) Synthesis of unsaturated polyester resin 10.5 mols of propylene glycol and 4 mols of isophthalic acid were reacted at a temperature of 180° C. to 200° C. for 6 hours in the presence of a carbon dioxide gas stream, and 6 mols of fumaric acid were then added to the resultant product and reacted at 215° C. to produce an unsaturated alkyd resin having an acid value of less than 35. 65 weight parts of the resultant alkyd resin were dissolved in 35 weight parts of styrene containing 0.02 weight part of hydroquinone.

The thus produced product was designated as an "unsaturated polyester resin (B)," and it had the viscosity of 17 poises at 25° C.

(ii) Synthesis of unsaturated epoxy-ester resin 1900 weight parts of Araldite GY250 (the trade name of epoxy resin produced by Ciba Co.), 720 weight parts of acrylic acid, 11.4 weight parts of dimethylamine hydrochloride and 0.8 weight part of hydroquinone were mixed and heated at 120° C. for 2 hours in an oil bath. 30 weight parts of styrene and 2 weight parts of methyl methacrylate were added and dissolved in 70 weight parts of the resultant product to produce an "unsaturated epoxyester resin (B)". The thus produced and "unsaturated epoxy-ester resin (B)" had the viscosity of 3 poises at 25° C.

(iii) Preparation of thermoplastic resin

Polyvinyl methyl ether, which is sold under the trade name of Lutonal-40 by BASF in Germany, was dissolved in methyl methacrylate to produce a solution containing a 50% of polyvinyl methyl ether and the resultant solution was designated as a "thermoplastic resin (B)."

In this Example 2, an adhesive composition was prepared in the following procedures for the purpose of bonding a steel plate or an aluminum plate.

20 weight parts of the unsaturated polyester resin (B) were mixed with 80 weight parts of the unsaturated epoxy-ester resin (B), and the resultant mixture was then mixed with 10 weight parts of the thermoplastic resin to produce an "adhesive composition (3)."

Also, 100 weight parts of the unsaturated polyester resin (B) were mixed with 10 weight parts of the thermoplastic resin (B) to produce an "adhesive composition (4)."

The adhesive compositions (3) and (4) were tested for compatibility and bonding strength, and the test results are given in the following Table II.

TABLE II

| Performance | Composition | | | |
|---|---|---|---|---|
| | Adhesive composition | | Unsaturated Polyester resin (B) | Unsaturaged epoxyester resin (B) |
| | (3) | (4) | | |
| Compatibility | Good | Bad [1] | | |
| Bonding strength: | | | | |
| Steel plate-steel plate | 181 kg./cm.$^2$ | 100 kg./cm.$^2$ | 60 kg./cm.$^2$ | 110 kg./cm.$^2$ |
| Aluminum-aluminum | 120 kg./cm.$^2$ | 49 kg./cm.$^2$ | 25 kg./cm.$^2$ | 50 kg./cm.$^2$ |

[1] Homogeneity of the adhesive composition (4) was broken.

In this example, 100 weight parts of each the adhesive compositions (3) and (4) was mixed with one weight part of benzoyl peroxide and 0.1 weight part of dimethylaniline and the curing of the adhesive compositions was conducted at room temperature for one day. The steel plate and the aluminum plate were cut into strips as in Example 1. Two strips of the steel plate or two strips of the aluminum plate were adhered each other to form a corrseponding test piece as in Example 1. After completion of the curing of the adhesive compositions (3) and (4), the test pieces were tested for a bonding strength as in Example 1.

Also it was found that the homogeneity of the adhesive (3) was not broken even after it was left as it was at room temperature for three months and also that such a long-stored composition (3) was the same in the bonding strength as an adhesive composition (3) which was freshly produced.

What we claim is that:

1. A one-package type adhesive composition which comprises a mixture of 500 weight parts of an unsaturated polyester resin, 300 weight parts of an unsaturated epoxy resin and 200 weight parts of a thermoplastic resin, said epoxy ester resin being compatible with said thermoplastic resin, (A) said unsaturated polyester resin being prepared by reacting 10.5 mols of propylene glycol, 5 mols of maleic acid anhydride and 5 mols of phthalic acid anhydride at a temperature of 180° C. to 200° C. in the presence of a carbon dioxide gas stream to produce an unsaturated alkyd resin having an acid value of about 40, and dissolving 70 weight parts of the resultant alkyd resin in 30 weight parts of styrene containing 0.02 weight part of hydroquinone, (B) said unsaturated epoxy ester being prepared by reacting a mixture of:
  98 weight parts of maleic acid anhydride, 2000 weight parts of a compound of the formula

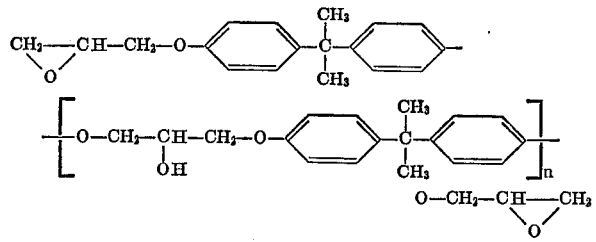

said compound being a liquid with a viscosity of 120–150 poise at 25° C., an epoxy equivalent of 184–194 and a molecular weight of 380, 687 weight parts of methacrylic acid, 11.3 weight parts of benzyl dimethylamine and 0.01 weight part of hydroquinone, at 120° C. for 2 hours, (C) said thermoplastic being prepared by heating a mixture of 40 weight parts of styrene and 30 weight parts of methyl methacrylate with 30 weight parts of polymethyl methacrylate with a degree of polymerization of about 500.

2. A one-package type adhesive composition which comprises a mixture of 20 weight parts of an unsaturated polyester resin, 80 weight parts of an unsaturated epoxy ester resin and 10 weight parts of a thermoplastic resin, said epoxy ester being compatible with said thermoplastic resin, (A) said unsaturated polyester resin being prepared by reacting 10.5 mols of propylene glycol and 4 mols of isophthalic acid at a temperature of 180° C. to 200° C. for 6 hours in the presence of a carbon dioxide gas stream, and then adding 6 mols of fumaric acid to the resultant product and reacting at 215° C. to produce an unsaturated alkyd resin having an acid value of less than 35, and dissolving 65 weight parts of the resultant alkyd resin in 35 weight parts of styrene containing 0.02 weight part of hydroquinone, (B) said unsaturated epoxy ester being prepared by reacting a mixture of 1900 weight parts of a compound of the formula

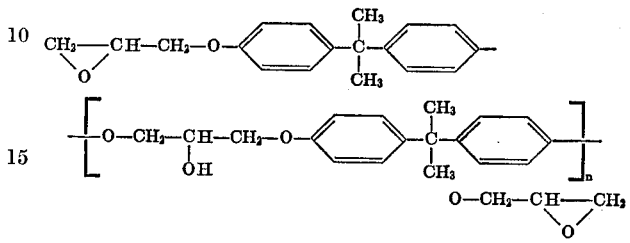

which is a liquid with a viscosity of 90–110 poise at 25° C and has an epoxy equivalent of 180–190, 720 weight parts of acrylic acid, 11.4 weight parts of dimethylamine hydrochloride and 0.8 weight part of hydroquinone and heating at 120° C. for 2 hours, and dissolving 30 weight parts of styrene and 2 weight parts of methyl methacrylate in 70 weight parts of the resultant product, (C) said thermoplastic being a 50% solution of polyvinyl methyl ether in methyl methacrylate.

References Cited
UNITED STATES PATENTS

| | | | |
|---|---|---|---|
| 3,674,893 | 7/1972 | Nowak | 260—835 |
| 3,506,736 | 4/1970 | Najvar | 260—835 |
| 3,621,093 | 11/1971 | Svoboda | 260—836 |
| 3,420,914 | 1/1969 | May | 260—837 |
| 3,256,226 | 6/1966 | Fekete | 260—837 |
| 3,535,403 | 10/1970 | Holub | 260—837 |
| 3,586,527 | 6/1971 | Aronoff | 260—837 |

PAUL LIEBERMAN, Primary Examiner

U.S. Cl. X.R.

156—330; 161—184; 260—836, 837 R